US010725297B2

(12) United States Patent
Kraver

(10) Patent No.: US 10,725,297 B2
(45) Date of Patent: Jul. 28, 2020

(54) METHOD AND SYSTEM FOR IMPLEMENTING A VIRTUAL REPRESENTATION OF A PHYSICAL ENVIRONMENT USING A VIRTUAL REALITY ENVIRONMENT

(71) Applicant: CCP hf., Reykjavik (IS)

(72) Inventor: Adam Kraver, Tucker, GA (US)

(73) Assignee: CCP hf., Reykjavik (IS)

( * ) Notice: Subject to any disclaimer, the term of this patent is extended or adjusted under 35 U.S.C. 154(b) by 0 days.

(21) Appl. No.: 14/608,067

(22) Filed: Jan. 28, 2015

(65) Prior Publication Data
US 2016/0217616 A1    Jul. 28, 2016

(51) Int. Cl.
*G02B 27/01* (2006.01)
*G06F 3/01* (2006.01)
(Continued)

(52) U.S. Cl.
CPC ............ *G02B 27/017* (2013.01); *A63F 13/00* (2013.01); *A63F 13/212* (2014.09); *A63F 13/213* (2014.09); *A63F 13/5375* (2014.09); *G06F 3/012* (2013.01); *G06F 3/048* (2013.01); *G06F 3/04815* (2013.01); *G02B 2027/014* (2013.01)

(58) Field of Classification Search
CPC . G06T 15/20; G06T 3/40; G06T 13/60; G06F 3/012; G06F 3/038; G06F 3/048; G06F 3/04815; G01C 17/34; A63F 13/10; A63F 13/00; A63F 13/212; A63F 13/213; A63F 13/5375; G02B 2027/014; G02B 27/017
See application file for complete search history.

(56) References Cited

U.S. PATENT DOCUMENTS 6,032,193 A      2/2000 Sullivan
6,091,410 A  *   7/2000 Lection ................... G06F 3/038
                                                715/706
(Continued)

FOREIGN PATENT DOCUMENTS

RU        2433487 C2    11/2011
RU        2536354 C2    12/2014

OTHER PUBLICATIONS

OpenGL Shading Language Course by author, Jacob Rodriguez Villar on year 2004.*

(Continued)

*Primary Examiner* — Ming Wu
(74) *Attorney, Agent, or Firm* — Alston & Bird LLP

(57) ABSTRACT

The present disclosure provides computer systems, apparatuses, computer-executable methods and one or more non-transitory computer-readable media for implementing a virtual representation of a physical environment using a virtual reality environment. An example method includes receiving a first set of sensor data from a sensor, identifying at least one physical object within a field of view of the sensor from the first set of sensor data, generating a virtual representation of the at least one physical object based at least in part on the first set of sensor data, generating a virtual environment comprising the virtual representation of the at least one physical object and a virtual representation of at least one virtual object, and displaying the virtual environment via a display device.

19 Claims, 8 Drawing Sheets

(51) Int. Cl.
*G06F 3/048* (2013.01)
*A63F 13/212* (2014.01)
*G06F 3/0481* (2013.01)
*A63F 13/213* (2014.01)
*A63F 13/00* (2014.01)
*A63F 13/5375* (2014.01)

(56) References Cited

U.S. PATENT DOCUMENTS

| | | | |
|---|---|---|---|
| 6,181,343 B1 * | 1/2001 | Lyons | A63F 13/10 715/850 |
| 7,301,536 B2 * | 11/2007 | Ellenby | G01C 17/34 345/419 |
| 7,814,154 B1 | 10/2010 | Kandekar et al. | |
| 7,864,168 B2 | 1/2011 | French | |
| 8,059,894 B1 * | 11/2011 | Flagg | G06K 9/00362 382/173 |
| 8,576,276 B2 | 11/2013 | Bar-Zeev et al. | |
| 8,585,476 B2 | 11/2013 | Mullen | |
| 8,687,021 B2 | 4/2014 | Bathiche et al. | |
| 8,713,450 B2 | 4/2014 | Garbow et al. | |
| 8,933,876 B2 | 1/2015 | Galor et al. | |
| 9,753,687 B1 | 9/2017 | Cronin | |
| 2003/0032484 A1 | 2/2003 | Ohshima et al. | |
| 2006/0087509 A1 * | 4/2006 | Ebert | G06T 13/60 345/473 |
| 2007/0110298 A1 * | 5/2007 | Graepel | G06K 9/00355 382/154 |
| 2008/0201751 A1 | 8/2008 | Ahmed et al. | |
| 2008/0313386 A1 | 12/2008 | Iwasaki | |
| 2009/0016255 A1 | 1/2009 | Park | |
| 2009/0141023 A1 * | 6/2009 | Shuster | G06T 3/40 345/419 |
| 2009/0225074 A1 * | 9/2009 | Bates | G06T 15/20 345/419 |
| 2010/0008269 A1 | 1/2010 | Chun et al. | |
| 2010/0161859 A1 | 6/2010 | Brandt et al. | |
| 2010/0309097 A1 | 12/2010 | Raviv et al. | |
| 2011/0238794 A1 | 9/2011 | Wu et al. | |
| 2012/0050767 A1 | 3/2012 | Tanaka | |
| 2012/0105473 A1 | 5/2012 | Bar-Zeev et al. | |
| 2012/0122570 A1 | 5/2012 | Baronoff | |
| 2012/0166969 A1 | 6/2012 | Gillo et al. | |
| 2012/0206452 A1 | 8/2012 | Geisner et al. | |
| 2012/0249416 A1 | 10/2012 | Maciocci et al. | |
| 2012/0249741 A1 | 10/2012 | Maciocci et al. | |
| 2012/0264510 A1 | 10/2012 | Wigdor et al. | |
| 2013/0042296 A1 | 2/2013 | Hastings et al. | |
| 2013/0050069 A1 | 2/2013 | Ota | |
| 2013/0117377 A1 | 5/2013 | Miller | |
| 2013/0121563 A1 | 5/2013 | Chen et al. | |
| 2013/0125027 A1 | 5/2013 | Abovitz | |
| 2013/0141419 A1 | 6/2013 | Mount et al. | |
| 2013/0162639 A1 | 6/2013 | Muench et al. | |
| 2013/0183645 A1 * | 7/2013 | Wallace | G09B 5/02 434/234 |
| 2013/0194164 A1 | 8/2013 | Sugden et al. | |
| 2013/0257904 A1 * | 10/2013 | Roth | G06F 3/012 345/629 |
| 2013/0328762 A1 | 12/2013 | McCulloch et al. | |
| 2013/0328928 A1 | 12/2013 | Yamagishi et al. | |
| 2014/0063061 A1 * | 3/2014 | Reitan | G09G 3/003 345/633 |
| 2014/0078176 A1 | 3/2014 | Kim et al. | |
| 2014/0128161 A1 | 5/2014 | Latta et al. | |
| 2014/0160162 A1 | 6/2014 | Balachandreswaran et al. | |
| 2014/0204002 A1 | 7/2014 | Bennet et al. | |
| 2014/0206443 A1 * | 7/2014 | Sharp | G06T 7/0075 463/31 |
| 2014/0368533 A1 | 12/2014 | Salter et al. | |
| 2015/0007114 A1 | 1/2015 | Poulos et al. | |
| 2015/0016777 A1 | 1/2015 | Abovitz et al. | |
| 2015/0260990 A1 | 9/2015 | Ueno et al. | |
| 2015/0312559 A1 | 10/2015 | Ueno et al. | |
| 2015/0352437 A1 | 12/2015 | Koseki et al. | |
| 2016/0012297 A1 * | 1/2016 | Kanga | G06K 9/00771 382/103 |
| 2016/0299569 A1 | 10/2016 | Fisher et al. | |
| 2016/0345871 A1 * | 12/2016 | Matsumoto | A61B 5/0077 |
| 2017/0123492 A1 | 5/2017 | Marggraff et al. | |
| 2017/0169616 A1 | 6/2017 | Wiley et al. | |
| 2017/0235462 A1 | 8/2017 | Zhou | |
| 2018/0095616 A1 | 4/2018 | Valdivia et al. | |
| 2018/0160881 A1 | 6/2018 | Okabe et al. | |
| 2018/0174366 A1 | 6/2018 | Nishibe et al. | |
| 2018/0366090 A1 | 12/2018 | Shatzki et al. | |
| 2019/0258320 A1 | 8/2019 | Yang et al. | |

OTHER PUBLICATIONS

LaViola, Jr. J. J., *Bringing VR and Spatial 3D Interaction to the Masses Through Video Games*, Graphically Speaking, IEEE Computer Society (Sep.-Oct. 2008) 10-15.
Adobbati, R. et al., *Gamebots: A 3D Virtual World Test-Bed for Multi-Agent Research*, Agents '01, ACM (2001) 6 pages.
Di Blas, N. et al., *The SEE Experience: Edutainment in 3D Virtual Worlds*, Eric, IR 058 816, ED 482 149, Papers Museum & The Web 2003 (2003) 14 pages.
Kato, H. et al., *Virtual Object Manipulation on a Table-Top AR Environment*, Proceedings of the International Symposium on Augmented Reality (ISAR 2000) 9 pages.
Ohshima, T. et al., $AR^2$ *Hockey: A Case Study of Collaborative Augmented Reality*, Proc. IEEE Virtual Reality Annual International Symposium (VRAIS'98) (Mar. 1998) 268-275, 8 pages.
Piekarski, W. et al., *ARQuake: The Outdoor Augmented Reality Gaming System*, Communications of the ACM, vol. 45, No. 1 (Jan. 2002) 36-38.
Szalavari, Z. et al., *Collaborative Gaming in Augmented Reality*, ACM Symposium on Virtual Reality Software and Technology (1998) 1-19.
Widder, B., *Best Augmented Reality Apps* [online] [retrieved Sep. 26, 2014]. Retrieved from the Internet: <URL: http://www.digitaltrends.com/mobile/best-augmented-reality-apps/>. (dated Mar. 14, 2014) 5 pages.
U.S. Appl. No. 14/608,047, filed Jan. 28, 2015; In re: Kraver et al., entitled *Method and System for Receiving Gesture Input via Virtual Control Objects*.
U.S. Appl. No. 14/608,054, filed Jan. 28, 2015; In re: Kraver, entitled *Method and System for Implementing a Multi-User Virtual Environment*.
Non-Final Office Action for U.S. Appl. No. 14/608,047, dated Jul. 15, 2016.
Final Office Action for U.S. Appl. No. 14/608,054 dated Sep. 2, 2016, 67 pages.
Final Office Action for U.S. Appl. No. 14/608,047 dated Dec. 30, 2016, 17 pages.
Non-Final Office Action for U.S. Appl. No. 14/608,054, dated Feb. 17, 2016.
International Search Report and Written Opinion for International Patent Application No. PCT/IB2016/050408 dated Apr. 11, 2016, 14 pages.
International Search Report and Written Opinion for International Patent Application No. PCT/IB2016/050410 dated Apr. 20, 2016, 14 pages.
International Search Report and Written Opinion for International Patent Application No. PCT/IB2016/050411 dated May 2, 2016, 14 pages.
Office Action for U.S. Appl. No. 14/608,054 dated May 25, 2017.
Notice of Allowance for U.S. Appl. No. 14/608,047 dated Aug. 23, 2017, 9 pages.
Office Action for U.S. Appl. No. 14/608,054 dated Mar. 22, 2018.
Office Action for U.S. Appl. No. 14/608,054 dated Dec. 12, 2018.
Office Action for European Application No. 16 708 207.2 dated Nov. 23, 2018, 8 pages.
Office Action for U.S. Appl. No. 15/815,053 dated Apr. 15, 2019.
Office Action for European Application No. 16 704 049.2 dated Feb. 25, 2019, 9 pages.

(56) References Cited

OTHER PUBLICATIONS

Final Office Action for U.S. Appl. No. 14/608,054 dated Jul. 2, 2019.
Office Action for Russian Application No. 2017130354 dated Sep. 3, 2019, 12 pages including English translation.
Office Action for Russian Application No. 2017130356 dated Sep. 3, 2019, 10 pages including English translation.
Office Action for Russian Application No. 2017130355 dated Jul. 26, 2019, 17 pages including English translation.
Non-Final Office Action for U.S. Appl. No. 15/815,053 dated Feb. 27, 2020.
Notice of Allowance for U.S. Appl. No. 14/608,054 dated Mar. 17, 2020.

* cited by examiner

METHOD AND SYSTEM FOR IMPLEMENTING A VIRTUAL REPRESENTATION OF A PHYSICAL ENVIRONMENT USING A VIRTUAL REALITY ENVIRONMENT

TECHNOLOGICAL FIELD

Example embodiments of the present invention relate generally to virtual reality interfaces and, more particularly, to methods, systems, apparatuses, and computer readable media for providing for generation of virtual representations of proximate physical objects.

BACKGROUND

Advances in technology have resulted in consumer electronics becoming more and more powerful. In particular, advances in display, graphics, processor, network, and sensor technology have provided technological breakthroughs that have made it feasible to mass produce and market devices capable of providing a virtual reality (VR) experience to consumers. In this regard, problems and challenges in current implementations of VR interfaces have been identified by the inventor, and solutions to these problems and challenges are implemented in exemplary embodiments.

BRIEF SUMMARY

Various embodiments of the present invention are directed to improved apparatuses, methods, and computer readable media for providing a virtual reality interface. In accordance with one exemplary embodiment, a computer-executable method is provided for implementing a virtual representation of a physical environment using a virtual reality environment. The method includes receiving a first set of sensor data from a sensor, identifying at least one physical object within a field of view of the sensor from the first set of sensor data, determining a physical position of the at least one physical object using at least the first set of sensor data, generating a virtual representation of the at least one physical object based at least in part on the first set of sensor data, generating a virtual environment comprising the virtual representation of the at least one physical object and a virtual representation of at least one virtual object, wherein the virtual environment comprises a set of coordinates which correspond to a physical area in which the at least one physical object is present, and wherein the physical object is positioned in the virtual environment at a coordinate location that maps to the physical position of the at least one physical object, and sending instructions to a display device to facilitate display of at least a portion of the virtual environment. The display device may be a head-mounted display.

The method may also include storing the virtual representation of the at least one physical object in a set of cached object data, receiving a second set of sensor data, determining that the at least one physical object is not present in the second set of sensor data, retrieving the virtual representation of the at least one physical object from the set of cached object data, and sending instructions to a display device to display the retrieved virtual representation of the at least one physical object at a last known position of the at least one physical object. The method may include determining that the at least one physical object is at least partially occluded prior to retrieving the virtual representation of the physical object form the set of cached object data. The at least one physical object may be a user. Identifying the at least one physical object may include providing the first set of sensor data to a graphics processing unit, and using at least one shader executing on the graphics processing unit to generate at least one polygon corresponding to he at least one physical object from the first set of sensor data. The method may include instructing the display device to display the at least one polygon within the virtual environment. The method may include identifying the physical object within the first set of sensor data by defining a mask about a plurality of pixels defining the physical object, wherein the mask extends the plurality of pixels defining the physical object by a predetermined number of pixels. The method may include placing the virtual representation of the at least one physical object at a virtual location corresponding to a physical location of the at least one physical object. Identifying the at least one physical object from the first set of sensor data may include identifying a first plurality of pixels of the first set of sensor data as a user and a second plurality of pixels of the first set of sensor data as background data. The at least one physical object may be defined within the first set of sensor data by the background data. The method may include generating the virtual representation of the physical object only in response to detecting that a user has entered a defined area associated with the physical object.

According to another exemplary embodiment, a non-transitory computer readable storage medium comprising instructions for implementing a virtual representation of a physical environment using a virtual reality environment is provided. The instructions, when executed by a processor, configure the processor for receiving a first set of sensor data from a sensor, identifying at least one physical object within a field of view of the sensor from the first set of sensor data, determining a physical position of the at least one physical object using at least the first set of sensor data, generating a virtual representation of the at least one physical object based at least in part on the first set of sensor data, generating a virtual environment comprising the virtual representation of the at least one physical object and a virtual representation of at least one virtual object, wherein the virtual environment comprises a set of coordinates which correspond to a physical area in which the at least one physical object is present, and wherein the physical object is positioned in the virtual environment at a coordinate location that maps to the physical position of the at least one physical object, and sending instructions to a display device to facilitate display of at least a portion of the virtual environment.

The display device may be a head-mounted display. The instructions may further comprise further comprise storing the virtual representation of the at least one physical object in a set of cached object data, receiving a second set of sensor data, determining that the at least one physical object is not present in the second set of sensor data, retrieving the virtual representation of the at least one physical object from the set of cached object data, and sending instructions to a display device to display the retrieved virtual representation of the at least one physical object at a last known position of the at least one physical object. The instructions may include determining that the at least one physical object is at least partially occluded prior to retrieving the virtual representation of the physical object form the set of cached object data. The at least one physical object may be a user. Identifying the at least one physical object may include providing the first set of sensor data to a graphics processing unit, and using at least one shader executing on the graphics processing unit to generate at least one polygon corresponding to he at least one physical object from the first set of sensor data.

The instructions may include instructing the display device to display the at least one polygon within the virtual environment. The instructions may include identifying the physical object within the first set of sensor data by defining a mask about a plurality of pixels defining the physical object, wherein the mask extends the plurality of pixels defining the physical object by a predetermined number of pixels.

The instructions may include placing the virtual representation of the at least one physical object at a virtual location corresponding to a physical location of the at least one physical object. Identifying the at least one physical object from the first set of sensor data may include identifying a first plurality of pixels of the first set of sensor data as a user and a second plurality of pixels of the first set of sensor data as background data. The at least one physical object may be defined within the first set of sensor data by the background data. The instructions may include generating the virtual representation of the physical object only in response to detecting that a user has entered a defined area associated with the physical object.

According to another exemplary embodiment, a system for implementing a virtual representation of a physical environment using a virtual reality environment is provided. The system includes sensor interface circuitry configured to receive a first set of sensor data from a sensor, identify at least one physical object within a field of view of the sensor from the first set of sensor data, and determine a physical position of the at least one physical object using at least the first set of sensor data. The system also includes virtual environment state management circuitry configured to generate a virtual representation of the at least one physical object based at least in part on the first set of sensor data, generate a virtual environment comprising the virtual representation of the at least one physical object and a virtual representation of at least one virtual object, wherein the virtual environment comprises a set of coordinates which correspond to a physical area in which the at least one physical object is present, and wherein the physical object is positioned in the virtual environment at a coordinate location that maps to the physical position of the at least one physical object, and send instructions to a display device to facilitate display of at least a portion of the virtual environment.

The display device may be a head-mounted display. The sensor interface circuitry may be further configured to receive a second set of sensor data, and determine that the at least one physical object is not present in the second set of sensor data, and the virtual environment state management circuitry may be further configured to store the virtual representation of the at least one physical object in a set of cached object data, retrieve the virtual representation of the at least one physical object from the set of cached object data, and send instructions to a display device to display the retrieved virtual representation of the at least one physical object at a last known position of the at least one physical object. The sensor interface circuitry may be further configured to determine that the at least one physical object is at least partially occluded prior to retrieving the virtual representation of the physical object form the set of cached object data.

The at least one physical object may be a user. Identifying the at least one physical object may include providing the first set of sensor data to a graphics processing unit, and using at least one shader executing on the graphics processing unit to generate at least one polygon corresponding to he at least one physical object from the first set of sensor data.

The virtual environment state management circuitry may be further configured to instruct the display device to display the at least one polygon within the virtual environment. The sensor interface circuitry may be further configured to identify the physical object within the first set of sensor data by defining a mask about a plurality of pixels defining the physical object, wherein the mask extends the plurality of pixels defining the physical object by a predetermined number of pixels. The virtual environment state management circuitry may be further configured to place the virtual representation of the at least one physical object at a virtual location corresponding to a physical location of the at least one physical object. Identifying the at least one physical object from the first set of sensor data may include identifying a first plurality of pixels of the first set of sensor data as a user and a second plurality of pixels of the first set of sensor data as background data. The at least one physical object may be defined within the first set of sensor data by the background data. The virtual environment state management circuitry may be further configured to generate the virtual representation of the physical object only in response to detecting that a user has entered a defined area associated with the physical object.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings.

Figure 1:
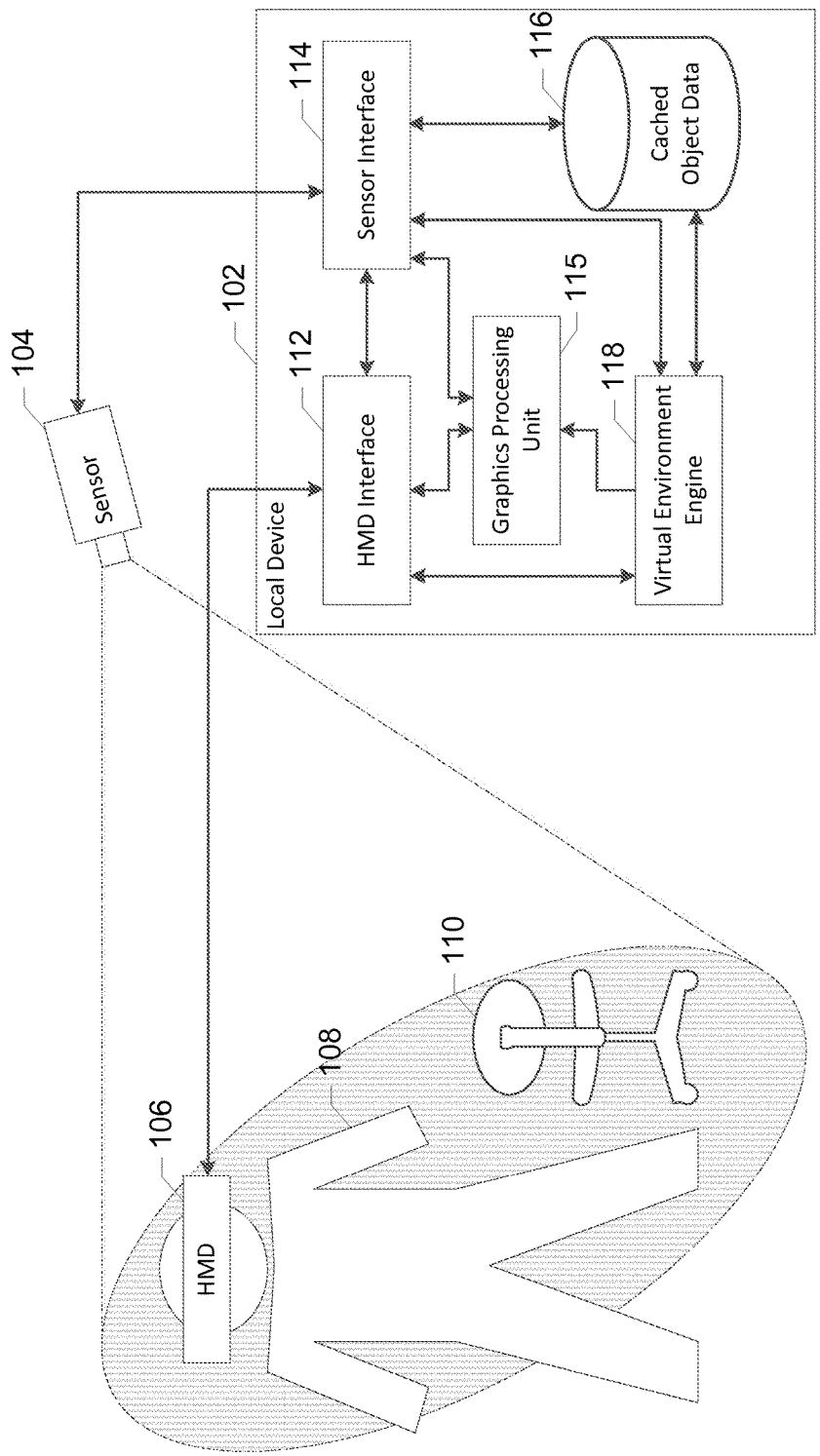
FIG. 1 is a block diagram illustrating a system within which exemplary embodiments may operate.

The accompanying drawings are not intended to be drawn to scale.

DETAILED DESCRIPTION

Exemplary embodiments provide computer systems, computer-executable methods and one or more non-transitory computer-readable media for providing a virtual representation of a local physical environment within a virtual reality (VR) environment. In particular, embodiments offer improved techniques for identifying physical objects from sensor data, storing data representing those physical objects, and generating virtual representations of those physical objects using sensor data and the stored data.

Glossary of Terms

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to electronic data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the terms "head-mounted display" and "HMD" are intended to refer to any display device that is attached, mounted, projects to, or otherwise provides an image on a surface that remains at a fixed position with respect to a user's viewing angle or line of vision. The term head-mounted display is intended to also include any other peripheral electronics and functionality that may be provided in conjunction with such a device. For example, a head-mounted display may include speakers, headphones, or other electronic hardware for audio output, a plurality of display devices (e.g., the use of two display devices, one associated with each of the user's eyes, to enable a stereoscopic, three-dimensional viewing environment), one or more position sensors (e.g., gyroscopes, global positioning system receivers, and/or accelerometers), beacons for external sensors (e.g., infrared lamps), or the like. Example head-mounted displays include the Oculus Rift™ manufactured by Oculus VR, the HMZ-T3W manufactured by Sony Corp., and the like.

As used herein, the terms "virtual environment" and "VR environment" are intended to refer a simulated environment with one or more objects that are projected onto or otherwise displayed to a user using an HMD in a manner such that the HMD provides the user with the sensation of being present or immersed within the virtual environment as if the virtual environment physically exists around the user. The term "virtual environment" is offered in contrast to the term "physical environment", which relates to an actual physical space.

The term "virtual environment state" is intended to refer to electronic data describing the virtual environment. The virtual environment state includes data sufficient to define a set of positions or locations of one or more objects associated with that virtual environment. It should be understood that the virtual environment state may be stored in a variety of data structures and/or formats. In some embodiments, the virtual environment state may be maintained by a "virtual environment engine" that tracks the location, status, and other attributes of objects within the virtual environment. The virtual environment engine may also manage interactions between objects within the virtual environment, such as by controlling trigger conditions, user inputs, and other events that result in changes to the virtual environment or objects therein. In some embodiments, the virtual environment engine may act in conjunction with a graphics device, renderer, or other hardware and software for generating a visual display of the virtual environment.

Although the virtual environment state may typically include an n-dimensional set of coordinates (typically three dimensions) that at least partially correspond to a given physical environment, it should be appreciated that a given virtual environment may not directly correspond to a physical environment. For example, a given virtual environment may allow a user or other objects to change position, change in size, change in shape, or the like in the virtual environment without a corresponding change or interaction in a physical environment. A given virtual environment may also map to a portion of a given physical environment (e.g., limited to an area of the physical environment visible to one or more sensors), and vice-versa (e.g., a limited portion of the virtual environment mapping to a physical environment, with user movement in the physical environment constrained to effecting changes in the limited portion of the virtual environment).

Objects that exist in the physical world may be included in the virtual environment as virtual representations of physical objects, and the term virtual environment should be understood not to exclude such virtual representations. For example, a sensor may detect the presence of a physical object in the physical environment around the user, and create a virtual object within the virtual environment corresponding to the detected physical object. The user may then be able to perceive the presence of the physical object by viewing the virtual object at a position in the virtual environment that corresponds to the position of the physical object in the physical environment.

The term "physical environment state" should be understood to refer to electronic data indicating the known or believed location of physical objects. The physical environment state is based at least in part upon data received from one or more sensors. In some embodiments, the physical environment state is also based on other data, such as derived from previous snapshots of the physical environment state, data from interface devices other than sensors (e.g., a computer keyboard or mouse), or the like.

The term "augmented environment" should be understood to refer to a combined environment including the physical environment and elements of the virtual environment. It should be noted that an augmented environment including elements of the physical environment (e.g., a video or photo image of a physical environment overlaid with virtual elements) is understood to be separate and distinct from a virtual environment that includes virtual elements that correspond to physical objects. For example, a digital photograph overlaid with tags or labels would be an augmented environment, while a system that detects the presence of a user, replaces the user with a virtual three-dimensional model, and then inserts the three-dimensional model into a virtual environment would not be an augmented environment, since the latter example uses entirely virtual constructs.

The term "sensor data" should be understood to refer to data received from one or more sensors that monitor a physical environment. Sensor data may include unprocessed data, such as raw data received directly from a sensor, sensor device driver, or the like, and processed data, such as raw data that is smoothed or filtered, or object data that is derived from multiple sets of raw sensor data (e.g., data derived from a multiple frames of captured data).

The term "virtual environment data" should be understood to refer to data relating to a virtual environment state. The use of the term virtual environment data should be understood to be separate and distinct from the term sensor data, such that data which qualifies as sensor data necessarily is not virtual environment data, and vice-versa. Typically, virtual environment data is provided by a virtual environment engine, while sensor data is provided by a sensor interface, though it should be appreciated that in some embodiments sensor data may be provided by a virtual environment engine, such as where the virtual environment engine provides sensor data as a pass-through from the sensor interface. Sensor data and virtual environment data may be differentiated in that sensor data does not require accessing of the virtual environment state, while virtual environment data necessarily requires access to the virtual environment state.

Overview

Embodiments of the presently disclosed invention generally describe novel systems, methods, and devices for generating and displaying virtual representations corresponding to a physical environment surrounding a user. Advances in electronics miniaturization, decreases in display costs, and increases in graphics processing power have made it practical for consumers to obtain devices capable of providing a virtual reality experience. In particular, consumers now have the ability to obtain reasonably priced head-mounted devices (HMDs) that provide a stereoscopic three-dimensional visual experience. Many such devices also include internal accelerometers and position detection modules for determining the location and viewing angle of the user, audio systems for providing sound, and the like. One of the primary anticipated uses for these devices is to enable the user to perceive that they are present in a virtual environment. Similarly, developments in sensor technology have provided for increased access to sensors that are capable of detecting the size, location, and position of users within a physical environment.

Prior to the development of consumer-grade HMDs, sensors, and other VR equipment, most VR environments were offered in a commercial setting, where users could pay to access the VR environment for a defined period of time. The commercial nature and relative rarity of these VR setups generally meant that most VR setups were operated in carefully controlled physical environments. In order to facilitate the VR experience, these physical environments were generally kept clear of extraneous objects and persons not participating in the VR environment. However, with the development of consumer-grade VR equipment, it has become dramatically more likely that users will be experiencing virtual environments in physical environments that are not carefully controlled in size and shape and cleared of extraneous objects.

The inventor has realized that physical objects present within a physical environment being utilized for a VR experience may present a hazard to users of the VR equipment whose vision is obscured by a HMD or other display device. Furthermore, the inventor has realized that it may be desirable in many cases to display the user and/or other objects located in the physical environment around the user so that the user does not feel disembodied when experiencing the VR environment and so the user has an appropriate frame of reference. As such, the inventor has developed various processes, devices, systems, and computer readable media to facilitate and support display of virtual representations of a local physical environment within a virtual environment.

To achieve these benefits and to support the presentation of virtual representations of physical objects in a virtual environment, the inventor has also addressed a number of technical challenges related to detection of objects in a physical environment, caching of data related to the objects, and displaying virtual representations of physical objects within a virtual environment.

Virtual environments such as described herein may be utilized to implement a variety of functionality across many different technical disciplines. Techniques for detection and display of local physical objects in a virtual environment may be employed to improve virtual environments used to control home automation systems (e.g., interfacing with home temperature, lighting, and security systems), factory operations (e.g., controlling robotic equipment, security systems, observing workers), mobile objects such as drones, and the like. The use of a virtual environment may also allow the user to leverage cameras or other sensors coupled to a remotely controlled device or system to present the user with the experience of being in the physical location of the controlled object. Detection of physical objects in the user's local physical environment ensures that the user will not inadvertently collide with those local physical objects when experiencing the virtual environment.

The inventors have also recognized that virtual environments may be utilized to capture and playback a user's local environment. The capture of local sensor data about a user's physical environment may allow the user to record audio, video, and other gathered sensor information about their physical environment for later review. For example, if the user has a home equipped with sensors for capturing a physical environment, the user may enable recording of that sensor data during a particular event (e.g., a child's birthday party), so that later on the user can playback the sensor readings to recreate the physical environment in a virtual scenario. Such embodiments may allow the user to relive recorded events or review events for which they were not present (e.g., to simulate being on the field of the Superbowl during the game, or to play back a wedding reception).

The inventors have also recognized deficiencies in methods and systems for tracking user positions and calibrating sensors used for position tracking for providing input to a virtual environment. To this end, the inventors have developed novel systems for integrating data received from infrared sensors, accelerometers, gyroscopes, magnetometers, and the like. Tracking data received from these disparate systems may be merged and smoothed to improve techniques for identifying user positions. Furthermore, the inventors have calibration mechanisms for adjusting input from different sensors. The inventors have developed techniques for determining when a HMD is placed on the user's head by monitoring data received from multiple sensors, and performing various detection and calibration actions in response. For example, when embodiments detect that the HMD has been picked up and placed on the user's head based on accelerometer readings, the user's position may be detected in three dimensional space and calibrated to a virtual environment coordinate system.

The inventors have also realized that a variety of interfaces and sensors may be employed to interact with a virtual environment. To interact with the virtual control objects as described herein (and to enable other interactions not provided by the virtual control objects), the inventors have realized that various devices providing different feedback mechanisms may be employed. For example, the use of specially designed gloves or shoes may provide tactile and/or haptic feedback related to touching buttons, feeling textures of items, and the like.

The inventors have also developed systems that provide novel features for sharing an environment with other users. Sensor data from both local and remote devices may be employed to provide proximity alarms and other feedback related to distance between the user and both physical objects in the user's local physical environment (e.g., other users, furniture), and virtual objects in the virtual environment (e.g., an avatar of another user participating in the virtual environment from another physical location).

It should also be understood that the embodiments presented herein are particularly directed to methods, apparatuses, systems, and computer program products for generating and interacting with virtual representations of physical objects in a user's local physical environment and otherwise causing computers to perform certain functions via input related to a virtual environment. As such, these embodiments are necessarily related and directed to improvements for providing such virtual environments and causing said computers to operate in particular improved manners, and these improvements address technical problems unique to said virtual environments.

System Architecture and Example Apparatus

Some exemplary embodiments of the present invention will now be described more fully hereinafter with reference to the accompanying drawings in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Methods, apparatuses, and computer program products of the present invention may be embodied by any of a variety of devices. For example, the method, apparatus, and computer program product of an example embodiment may be embodied by a networked device or devices, such as a servers or personal computers in communication with a HMD and one or more sensors. Additionally or alternatively, the computing device may include fixed or networked computing devices, such as a personal computer or a computer workstation. Still further, example embodiments may be embodied by any of a variety of mobile terminals, such as a portable digital assistant (PDA), wearable, mobile telephone, smartphone, laptop computer, tablet computer, or any combination of the aforementioned devices.

In this regard, FIG. 1 discloses an example computing system within which embodiments of the present invention may operate. A server 102 may function to communicate with one or more sensors 104 and an HMD 106. The server 102 may include hardware and software configured to generate and manage a virtual environment that is displayed to a user via the HMD 106. The server 102 may also receive data from one or more sensors 104 to identify objects in a local physical environment. A detailed exemplary embodiment of the server 102 is described further below with respect to FIG. 2.

The HMD 106 may send and receive electronic data from the server 102. For example, the HMD 106 may send data to the server 102 indicating readings from one or more accelerometers or other position sensors contained in the HMD 106. The HMD 106 may receive data indicating video content to display via one or more displays included in the HMD 106 and audio content to output via speakers, headphones, or the like included in the HMD 106. A detailed exemplary embodiment of the HMD 106 is described further below with respect to FIG. 3.

The sensor 104 may be any sensor operable to receive information about a user or the user's physical environment that may be employed by the server 102 to generate the virtual environment. For example, the sensor may be a Kinect® sensor manufactured by Microsoft, a Leap Motion® controller manufactured by Leap Motion Inc., a digital camera, a capacitive touch interface, or any other sensor capable of generating sensor data that indicates the presence of an object at particular location or depth. The sensor 104 may provide data in a raw format to the server 102, where the raw data may be converted into position information indicating the position of physical objects in the physical environment perceived by the sensor. Some embodiments may include multiple sensors and data from the sensors may be processed and combined together to determine the positions of objects within the physical environment.

The sensor 104 captures sensor data which may be employed to determine the state of the local physical environment, such as the location, size, and movement of one or more users, the location, size, and movement of physical objects within the sensor's field of view, and the like. It should be appreciated that, as described above, one or more of the sensors 104 may be included as part of or coupled to the HMD 106.

The sensor 104 may capture data in a particular physical area within the sensor's detection area or field of view. In the present context, the sensor's detection area includes a user 108 and a physical object 110, such as a desk chair. In some embodiments, the sensor detects objects by generation of a depth map. The depth map may include a frame of pixels associated with particular physical locations in the sensor's detection area. Each pixel may be associated with a value that represents the associated distance or depth of any objects located at the pixel from the sensor, such as in the case of infrared sensor emitter/receiver sensors.

The server 102 may include a sensor interface 114 which receives sensor data from the sensor 104. The sensor interface 114 may include both hardware and software for receiving data from the sensor 104. For example, the sensor interface 114 may include a physical wired connection or wireless antenna for communicating with the sensor 104. The sensor interface 114 may also include software applications for communicating with the sensor 104, such as device drivers and tools for interpreting and/or post-processing sensor data. For example, the sensor interface 114 may include a device driver and a tool for determining object positions based on received sensor data. The sensor interface 114 may communicate with an HMD interface 112, a virtual environment engine 118 and a datastore of cached object data 116. The cached object data 116 may include sensor data related to particular detected objects, polygons or other virtual representations corresponding to detected virtual objects, or the like. The sensor interface 114 may provide the HMD interface 112 with sensor data for use in recreating elements of a physical environment in a virtual environment displayed in the HMD 106. For example, the sensor interface 114 may bypass the virtual environment engine 118 and provide sensor data directly to the HMD interface 112 for display on the HMD 106. Additionally or alternatively, the sensor interface 114 may provide sensor data to the virtual environment engine 118 for use in updating the state of a virtual environment.

The sensor interface 114 may provide sensor data directly to a network interface (not shown)for transmission to one or more remote computers. Prior to providing the data to the network interface, the sensor interface 114 may perform post-processing, formatting, and/or packaging to the sensor data. For example, the sensor data may take the form of multiple frames of sensor captures over a period of time. These multiple frames of data may be used as part of a smoothing and/or filtering process to reduce or eliminate noise and artifacts from the data. In some embodiments, the sensor data may also be compressed or cropped prior to transmission to optimize for network bandwidth. In yet further embodiments, the sensor data may be analyzed to identify the presence of certain objects of interest (e.g., users) and the results of this analysis may be provided in conjunction with the raw sensor data. In yet further embodiments, the sensor interface 114 may track additional data related to a physical environment other than the raw sensor data. For example, the sensor interface 114 may identify the presence of background objects other than the user (e.g., furniture, walls, and other objects in the user's physical environment), and cache the presence of such objects even when outside of the field of view of the sensor (e.g., when the user occludes the sensor's field of view by moving in front of the object). The sensor interface 114 may transmit this cached object data as sensor data in addition to the raw sensor frame data received at any given time.

The sensor interface 114 may be configured to control transmission of sensor data to the network interface according to a variety of parameters. These parameters may include, but are not limited to, configuration settings for the sensor itself (e.g., refresh rates, resolutions, instructions for motors and lenses included in the sensor), configuration settings for network transmission (e.g., frequency with which to send frames of sensor data, frequency with which to send frames of cached background data), configuration settings related to post-processing and analysis of the sensor data (e.g., pixel radii for extending detected user masks, number of frames of sensor data to use for smoothing operations), or the like. The parameters may be configurable directly by users or administrators of the server 102, programmatically by applications executing upon the server 102, or via network instructions received from the network interface (e.g., from a remote server).

The sensor interface 114 may also be configured to receive sensor data from the a network interface. The sensor data received from the network interface may be associated with other users participating in a shared virtual environment. Sensor data received from the network interface may be processed in the same or a similar manner to sensor data received from the sensor 104. In some embodiments, certain post-processing or formatting operations are skipped for sensor data received from other computing nodes. For example, received sensor data may already have been processed with smoothing or filtering operations such that it would be redundant to perform the same operations on the local computing node. In some embodiments, sensor data received from remote sources includes metadata about the sensor data. For example, the sensor data metadata may indicate whether and which smoothing and filtering techniques have been employed, with which user of a virtual environment the sensor data is associated, whether the sensor data has been compressed, and the like.

In some embodiments, the sensor interface 114 may be configured to directly interface with a network, such as via a network interface, to transmit sensor data to a remote computer. Transmission of sensor data to a remote computer may allow the remote computer to more accurately recreate physical objects (such as the user) detected within the sensor data of the local computer. The inventors have also developed various techniques for receiving, managing, utilizing, and transmitting such sensor data to and from other computers. Further example embodiments of such methods, systems, and device components for supporting a multi-user virtual environment are provided in concurrently filed U.S. Patent Application Ser. No. 14/608,054 filed Jan. 28, 2015 entitled "METHODS AND APPARATUSES FOR IMPLEMENTING A MULTI-USER VIRTUAL ENVIRONMENT" (Attorney Docket Number 059638/454920), the entire contents of which are herein incorporated by reference.

In some embodiments, the sensor interface 114 may provide the sensor data to a graphics processing unit 115. The graphics processing unit 115 may be programmed to assist with detection of objects from frames of sensor data. For example, frames of sensor data may be presented as bitmaps or other formats suitable for processing by shader programs implemented using a graphics processing architecture. These "shaders" may be used to analyze one or more frames of sensor data to generate polygons for rendering in the virtual environment.

The graphics processing unit 115 may also provide data to the HMD interface 112. For example, the graphics processing unit 115 may include one or more frame buffers for display devices included in the HMD 106 for providing video output to the HMD 106. The graphics processing unit 115 may receive data from the virtual environment engine 118 related to the virtual environment and convert that data into a format suitable for display via the HMD 106.

The HMD interface 112 may include hardware and software configured to send and receive data from the HMD 106. To the extent that the HMD 106 includes one or more sensors, the HMD interface 112 may provide the same or similar functionality with respect to those HMD sensors as described above with respect to the sensor interface 114. The HMD interface 112 may also receive data from graphics hardware such as the graphics processing unit 115 for outputting display information to one or more displays included in the HMD 106, and audio hardware for outputting sound to one or more speakers included in the HMD 106. The HMD interface 112 may also include other hardware for communicating with elements of the HMD 106, including but not limited to hardware for communicating with vibration elements and other tactile feedback components, Light Emitting Diodes (LEDs) and other beacons for perception by sensors 104, and various other sensors 104 of the HMD 106 for sending and receiving various forms of input and output to facilitate presentation of the virtual environment to the user.

The virtual environment engine 118 may manage the state of a virtual environment provided by the server 102. The virtual environment engine 118 may receive sensor data from the sensor interface and update and modify the virtual environment based on the sensor data. For example, physical objects detected in the sensor data may be mapped into a virtual environment and/or used to generate virtual representations of the physical objects. The virtual environment engine 118 may also monitor for various triggers, interactions, and the like occurring within the virtual environment. The virtual environment engine 118 may thus include various threads, processes, and functions to maintain the state of the virtual environment, to transmit the state of the virtual environment to other devices (e.g., as virtual environment data), provide instructions for displaying the virtual environment, and otherwise facilitate the user's perception of and interaction with the virtual environment.

The virtual environment engine 118 may also enable the user or users to interface with a virtual environment through the use of virtual control objects. Exemplary embodiments of such virtual control objects and exemplary systems, methods, and devices for implementing interaction techniques with such objects are described further in concurrently filed U.S. Patent Application Ser. No. 14/608,047, filed Jan. 28, 2015, titled "METHOD AND SYSTEM FOR RECEIVING GESTURE INPUT VIA VIRTUAL CONTROL OBJECTS" (Attorney Docket Number 059638/454919), the entire contents of which are herein incorporated by reference.

Example Apparatuses for Implementing Embodiments of the Present Invention

Figure 2:
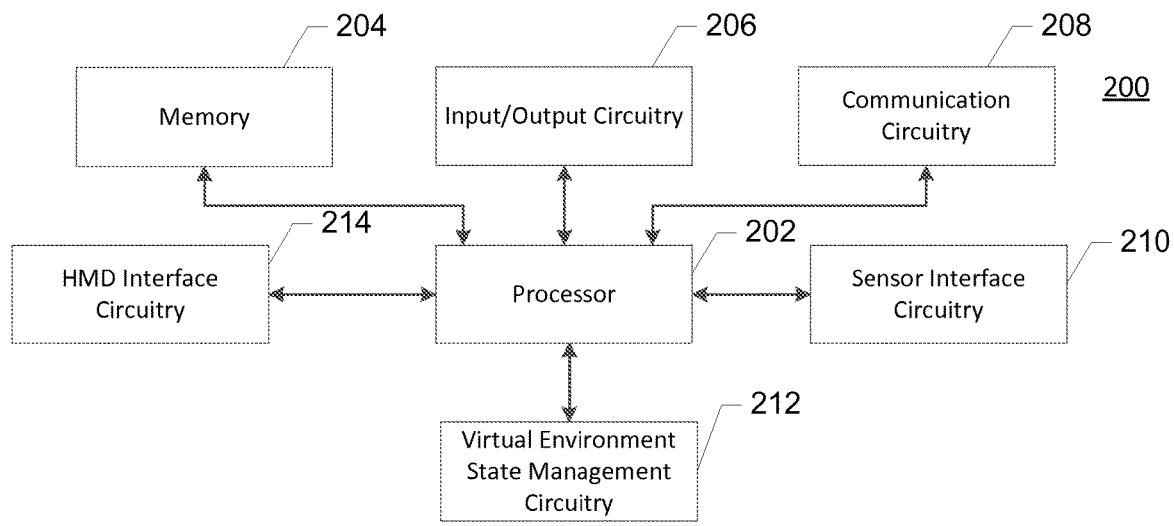
FIG. 2 is a block diagram illustrating exemplary components of a computing device in accordance with certain exemplary embodiments.

The server 102 may be embodied by one or more computing systems, such as the apparatus 200 shown in FIG. 2. As illustrated in FIG. 2, the apparatus 200 may include a processor 202, a memory 204, input/output circuitry 206, communication circuitry 208, sensor interface circuitry 210, virtual environment state management circuitry 212, and HMD interface circuitry 214. The apparatus 200 may be configured to execute the operations described above with respect to FIG. 1 and below with respect to FIGS. 4-10. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, also software for configuring the hardware. For example, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality used by other components of the apparatus 200.

In some embodiments, the processor 202 (and/or co-processor, graphics processing unit, or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communication circuitry 208 may be any means such as a device or circuitry embodied in either hardware or a combination of hardware and software that is configured to receive and/or transmit data from/to a network and/or any other device, circuitry, or module in communication with the apparatus 200. The communication circuitry 208 may include, for example, a network interface for enabling communications with a wired or wireless communication network. For example, the communication circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s)

The sensor interface circuitry 210 may include hardware configured to send instructions to, and receive data from, one or more sensors coupled to the server, such as the sensor 104 described above with respect to FIG. 1. The sensor interface circuitry 210 may implement a sensor interface 114 as described above with respect to FIG. 1. The sensor interface circuitry 210 may include electrical connections configured to, wired or wirelessly, communicate with the sensors. The sensor interface circuitry 210 may also facilitate capture and transmission of sensor data to other components of the system, such as providing sensor data to the virtual environment state management circuitry 212 for updating the virtual environment. The sensor interface circuitry 210 may also provide for post-processing and analysis of received sensor data prior to providing the sensor data to the virtual environment state management circuitry or the communications circuitry. The sensor interface circuitry 210 may also interface with one or more graphics processing units or other processing circuitry to assist with analysis of sensor data, such as detection of objects within frames of the sensor data. The sensor interface circuitry 210 may also include processing circuitry, such as the processor 202, to execute one or more tools, drivers, application programming interfaces (APIs) or the like for communicating with the sensors and processing sensor data. It should also be appreciated that, in some embodiments, the sensor interface circuitry 210 may include a separate processor, specially configured field programmable gate array (FPGA) or application specific interface circuit (ASIC) to perform the functions described herein. The sensor interface circuitry 210 is therefore implemented using hardware components of the apparatus configured by either hardware or software for implementing the functions enumerated above.

The virtual environment state management circuitry 212 includes hardware configured to manage a virtual environment state. As noted above, the virtual environment state includes electronic data indicating the locations and statuses of one or more objects in a virtual environment. The virtual environment state management circuitry 212 may also implement other aspects of a simulation to control the virtual environment state. For example, the virtual environment state management circuitry 212 may manage the rate at which the virtual environment updates, the resolution of coordinate locations of objects within the virtual environment, simulation of interaction between objects in the virtual environment, and the like. The virtual environment state management circuitry 212 may include processing circuitry, such as the processor 202, for managing the virtual environment. It should also be appreciated that, in some embodiments, the virtual environment state management circuitry 214 may include a separate processor, specially configured field programmable gate array (FPGA) or application specific interface circuit (ASIC) to perform the functions described herein. The virtual environment state management circuitry 212 is therefore implemented using hardware components of the apparatus configured by either hardware or software for implementing the functions enumerated above.

The HMD interface circuitry 214 functions to provide electronic data to and from a HMD to enable the user of the HMD to experience the virtual environment via the HMD and to provide sensor data to the virtual environment state management circuitry 212 from any sensors coupled to the HMD. For example, the HMD interface circuitry 214 may provide display output to one or more displays included in the HMD to display a portion of the virtual environment to the user, and receive input form one or more accelerometers included in the HMD to determine a user viewing angle to assist the virtual environment state management circuitry 212 to determine which particular portion of the virtual environment to display on the HMD display(s). In some embodiments, the HMD interface circuitry 214 includes a processor or graphics processing unit (GPU) to enable display output to the HMD. It should be appreciated that in some embodiments the virtual environment state management circuitry may also share or utilize the same processor to manage the virtual environment state to assist with managing the virtual environment.

In some embodiments, interface with the HMD is enabled via one or more drivers or APIs that send data as a single signal or other particularly defined communication technique uniquely associated with the HMD, while in other embodiments the HMD interface circuitry 214 communicates directly with particular components of the HMD (e.g., a single video-out to each display of the HMD, a single audio-out for audio components of the HMD, data inputs for each sensor coupled to the HMD).

The HMD interface circuitry 214 may include processing circuitry, such as the processor 202, for providing data to the HMD. It should also be appreciated that, in some embodiments, the HMD interface circuitry 214 may include a separate processor, specially configured field programmable gate array (FPGA) or application specific interface circuit (ASIC) to perform the functions described herein. The HMD interface circuitry 214 is therefore implemented using hardware components of the apparatus configured by either hardware or software for implementing the functions enumerated above.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Figure 3:
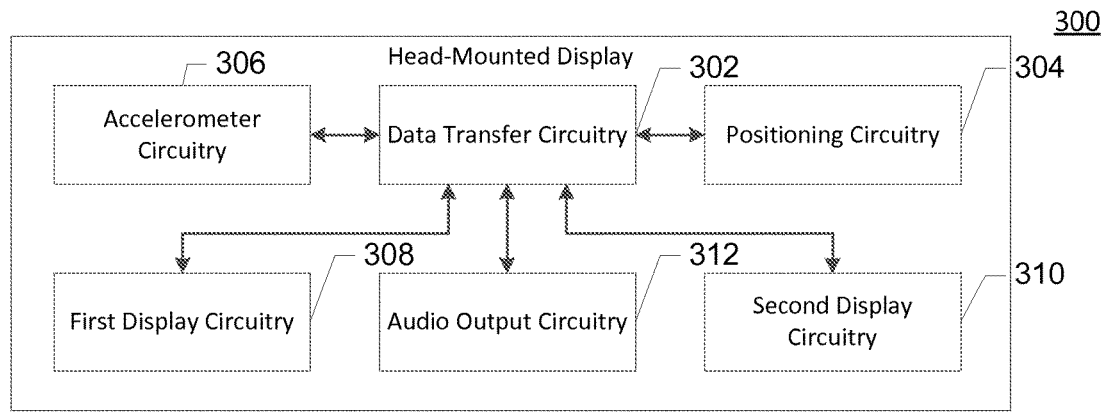
FIG. 3 is a block diagram illustrating exemplary components of a head-mounted display for use in a virtual reality system in accordance with some exemplary embodiments.

Referring now to FIG. 3, a block diagram is illustrated showing an example HMD, apparatus 300 that enables a user to experience a feeling of immersion in a virtual environment through the use of a head-mounted display screen. The apparatus 300 may include or otherwise be in communication with data transfer circuitry 302, position location circuitry 304, accelerometer circuitry 306, first display circuitry 308, second display circuitry 310, and audio output circuitry 312. As noted above, each of the components of the HMD may, in some embodiments, be implemented as a single housing with individual discrete components not in communication with one another (e.g., two separate displays each receiving a separate input signal, headphones and/or a microphone with discrete audio input/output signals, accelerometers that communicate directly with components of a server apparatus such as the apparatus 200, and the like), while in other embodiments the HMD apparatus 300 may be implemented as multiple components in communication with one another and with a server apparatus 200 via particular data transfer circuitry 302. The data transfer circuitry 302 may thus include electronic components configured to process electronic signals from the different components of the HMD and translate said components into a signal, signals, stream, or streams suitable for consumption by a server 200, and translate a signal, signals, stream, or streams from the server into signals suitable for consumption by the individual components of the HMD.

The HMD may include accelerometer circuitry 306 for detecting movement, pitch, bearing, orientation, and the like of the HMD. This information may be provided to a server for use in determining which area of the virtual environment corresponds to the orientation/bearing of the HMD, so that said corresponding area of the virtual environment may be displayed via the first display circuitry 308 and/or second display circuitry 310.

The positioning circuitry 304 may include electronics for configuring and communicating with location services modules and functionality associated with the HMD. For example, embodiments of the HMD apparatus 300 may include one or more infrared beacons that may be turned on and off in response to signals from a server. These infrared beacons may enable detection by infrared sensors coupled to the server. The positioning circuitry 304 may thus function to turn said infrared beacons on and off, cause the infrared beacons to blink at a particular rate or in a particular pattern, and otherwise assist with location detection and physical environment calibration functions. In some embodiments the HMD may include a global positioning system receive as part of the positioning circuitry 304, and it should be readily appreciated that a variety of different location and positioning technologies could be employed to assist with detection of the position of the HMD apparatus 300.

The first display circuitry 308 and the second display circuitry 310 include hardware, such as a projection screen, liquid crystal display panel, or the like for displaying signals received from the server. It should be appreciated that the first display circuitry 308 and the second display circuitry 310 may share some common hardware and/or software elements. For example, in some embodiments each of the first display circuitry 308 and the second display circuitry 310 are entirely separate displays receiving separate input signals. In other embodiments, the first display circuitry 308 and the second display circuitry 310 may include a single display panel with a separation by a physical element of the HMD (e.g., a blocking panel positioned near the user's nose). In yet further embodiments, a single display signal may be provided to circuitry which may split the signal to create two different sources for two separate display panels. The use of two displays in this manner allows for a server to output two separate images which may be employed to create a stereoscopic three-dimensional image. However, it should also be appreciated that in some embodiments the HMD may include only a single display or not even display a stereoscopic image at all, but still serve to display a virtual environment to the user of the HMD and enable interaction with that virtual environment in accordance with embodiments of the present invention.

The HMD apparatus 300 may include audio output circuitry 312 configured to output an audio signal. For example, the HMD apparatus 300 may include built-in speakers, headphones, or the like for outputting sounds to the user wearing the HMD.

Figure 4:
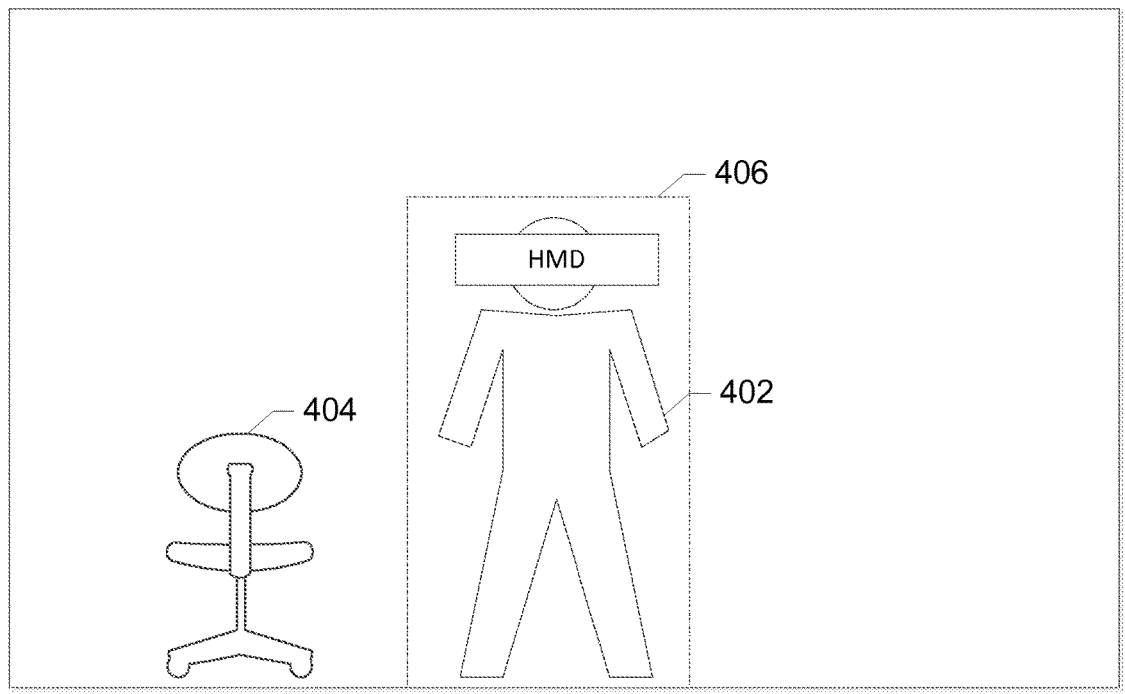
FIGS. 4-5 are illustrations of an exemplary physical environment and corresponding virtual environment containing virtual representations of objects in the physical environment in accordance with exemplary embodiments of the present invention.

Example Operations for Implementing a Virtual Representation of a Physical Environment FIG. 4 depicts an exemplary illustration of a sensor frame capture 400 of a physical environment in accordance with embodiments of the present invention. As described above, embodiments of the present invention advantageously function to detect the presence of physical objects in a physical area monitored by sensors used to provide a virtual environment. The detected physical objects may then be used to create virtual representations for display in the virtual environment.

The sensor frame capture 400 includes data indicating the presence of a user 402 and a physical object 404 (e.g., a desk chair). The presence of objects may be indicated within the sensor frame capture 400 by intensity values associated with particular pixels of the sensor frame capture 400. The intensity of a given pixel may correspond to a depth measurement associated with a particular physical location. Contiguous regions of pixels within the sensor frame capture 400 may be identified as likely to be a particular object or objects. Since the sensor frame capture 400 shares many characteristics with images used to generate three-dimensional renders, embodiments may leverage the use of special-purpose hardware designed for display and image operations, such as graphics processing units (GPUs). The sensor frame capture 400 may be provided to such a GPU and shader programs executing on the GPU may render the sensor data to generate polygons for display in the virtual environment. For example, in some embodiments triangles may be drawn by a GPU between contiguous or proximate pixels with similar depth values. Those triangles may be merged to define polygons that represent the boundaries of objects.

Detection of objects from the sensor frame capture 400 may also include differentiating between a user and other objects or individuals represented in the sensor data. To determine whether a particular object is a user, embodiments may analyze detected objects to identify particular characteristics associated with users. For example, embodiments may detect one or more beacons associated with a HMD worn by the user or an input device held by the user, and identify the object associated with such beacons as the user. Additionally or alternatively, users may be identified based on detecting particular gestures or actions performed in response to calibration instructions provided to the user (e.g., displaying a command to "lift your left hand" and then identifying an object performing the corresponding gesture input), by detecting movement across multiple frames (e.g., since non-user objects may tend to be stationary), or the like.

In some embodiments, one or more of the objects may include a mask 406 defining a region of pixels in a "halo" extruded about a detected object. The mask 406 may account for the fact that sensor data may be "noisy" and objects defined within the sensor data may not precisely match the boundaries of their physical object counterparts. To ensure that a particular object or user is fully captured within the sensor data, known or suspected edges of the object or user may be extended by a predefined number of pixels about the detected edges of the object. Pixels within this defined region may thus be identified or marked as associated with the particular user or object when the sensor data is analyzed, transmitted, or processed. It should be appreciated that, while in the present context the mask surrounds the entire user, in some embodiments different parts of the user's body may have separate masks, such that individual limbs, joints, articles of clothing, or the like are associated with separate mask values. For example, in some embodiments the user's head is identified by a separate mask than the rest of the user's body. The use of multiple masks in this manner may allow for certain parts of the user's body to be replaced or hidden in the corresponding virtual representation of the user. For example, the user's head may be swapped out for a three-dimensional model created in the virtual environment.

Figure 5:
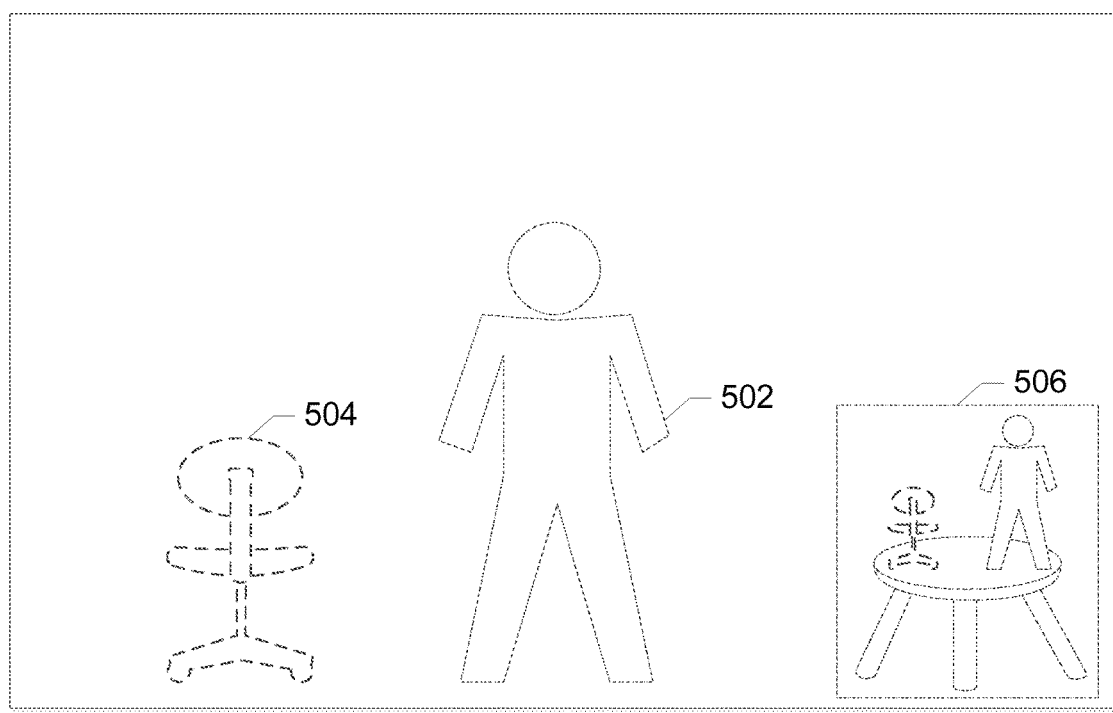

FIG. 5 depicts an exemplary virtual environment 500 corresponding to the sensor frame capture 400 described above with respect to FIG. 4. The virtual environment 500 includes virtual representations of the user 502, and a detected object 504. As noted above, the virtual representations are virtual constructs generated from sensor data. Unlike augmented reality environments, the objects displayed in the virtual environment are entirely virtual, rather than actual images or video captures of the objects. Placement of these virtual objects at a location within the virtual environment that corresponds to the same physical location of the object allows the user experiencing the virtual environment to be aware of the presence of the physical objects and have a frame of reference for their own body, even when their vision is completely occluded by a HMD.

The virtual environment may also include additional representations of the user's physical environment. For example, the virtual environment 500 includes a reduced representation 506 of the user's local physical environment, represented as a miniature display sitting on a virtual "table" generated within the virtual environment. When the user looks at the reduced representation 506, they may see themselves and any other physical objects in their local physical environment, such as the detected object 504. The relative orientation of the user 502 with respect to the detected object 504 may also control the relative orientation of the elements of the virtual representation representing the user and the detected object, such that the user is presented with the sensation of looking down into their physical environment from a different perspective.

The virtual representation of the user 502 and the detected object 504 may be reconstructed directly from sensor data, such that pixels of the sensor data are used to define the size and shape of the virtual representations. Alternatively, in some embodiments the detected sizes, shapes, and other information conveyed by the sensor data may be used to determine the particular type and/or size of object, and a stored virtual representation (e.g., a pre-rendered three dimensional model) may be inserted in the same physical location as the virtual representation.

Figure 6:
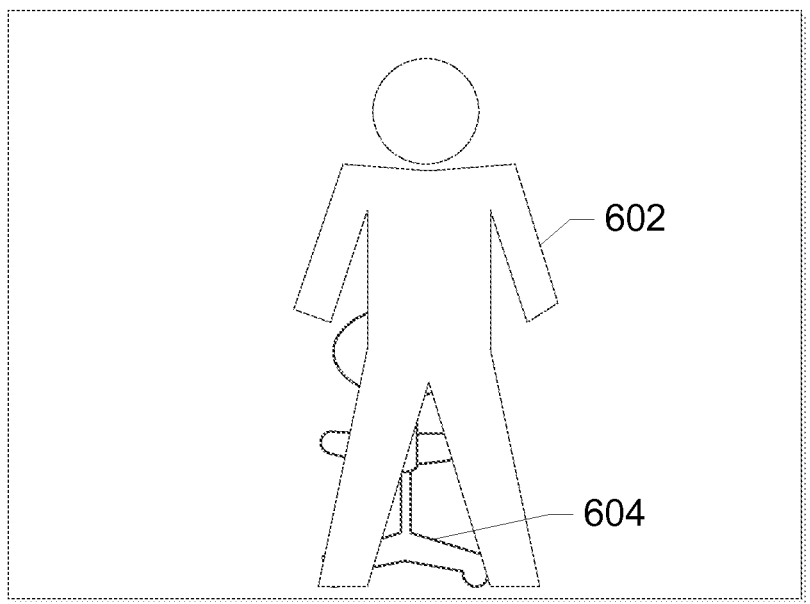
FIGS. 6-7 are illustrations of an exemplary process for maintaining cached object data using captured sensor data in accordance with exemplary embodiments of the present invention.
Figure 7:
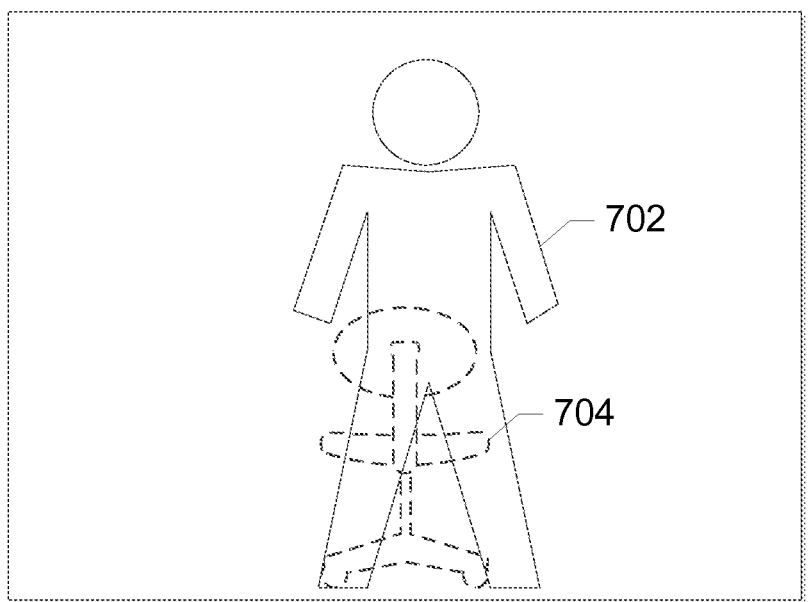

FIGS. 6 and 7 illustrate generation of a virtual environment including physical objects even in scenarios where those physical objects are not readily visible to the sensor. Upon detecting objects and differentiating between the user and other, non-user objects as described above with respect to FIGS. 4 and 5, detected non-user objects may be cached as cached object data. By caching detected objects that are generally expected to be stationary, such objects may be displayed as virtual representations even if the object is no longer detectable by a sensor, such as where the user steps in front of the detected object and occludes the object from the sensor. FIGS. 6 and 7 describe an example of this occlusion process.

FIG. 6 depicts a frame of sensor data 600 where the user 602 has stepped in front of an object 604. By stepping in front of the object 604, the user 602 has prevented the sensor capturing the frame of sensor data 600 from being able to determine the size, edges ,and contours of the detected object. However, upon originally detecting the object prior to the occlusion by the user, the size, shape, and location of the object may be stored in a buffer or otherwise cached. As depicted in FIG. 7, a virtual environment 700 may use the cached object data to recreate or maintain a virtual representation of the detected object 704 even when that object is no longer visible to the sensor. Caching of detected objects may be performed at periodic intervals, and embodiments may periodically verify or flush cached data. For example, in some embodiments cached data may be discarded when the user is no longer detected to be at a physical environment that occludes the object related to the cached data. In other embodiments, cached data may be discarded upon receiving sensor data that indicates the object is no longer present at the cached location. In yet further embodiments, cached objects may "fade" over time as the cache data becomes increasingly stale, reflecting within the virtual representation that the presence of the cached object is no longer reliable.

In some embodiments, sensor data may be "segmented" into foreground or "user" elements and background data. Objects designated as background may be cached differently than objects designated as foreground objects. For example, in some embodiments only background objects may be cached, since the expectation is that foreground objects will rarely be occluded.

Scene segmentation may also include detection of particular objects within a given set of sensor data. For example, objects may be tagged with infrared beacons, quick response (QR) codes, or the like to identify particular objects within the sensor data. Objects marked by such techniques may be analyzed to segment a particular object from its background in the sensor data. Alternatively, objects may have particular patterns of sensor data such that a particular object can be recognized from a set of sensor data according to known characteristics of the object. For example, objects may be "scanned" by a sensor and a user may indicate the object type so the sensor is aware of the particular object for future object detection operations.

Figure 8:
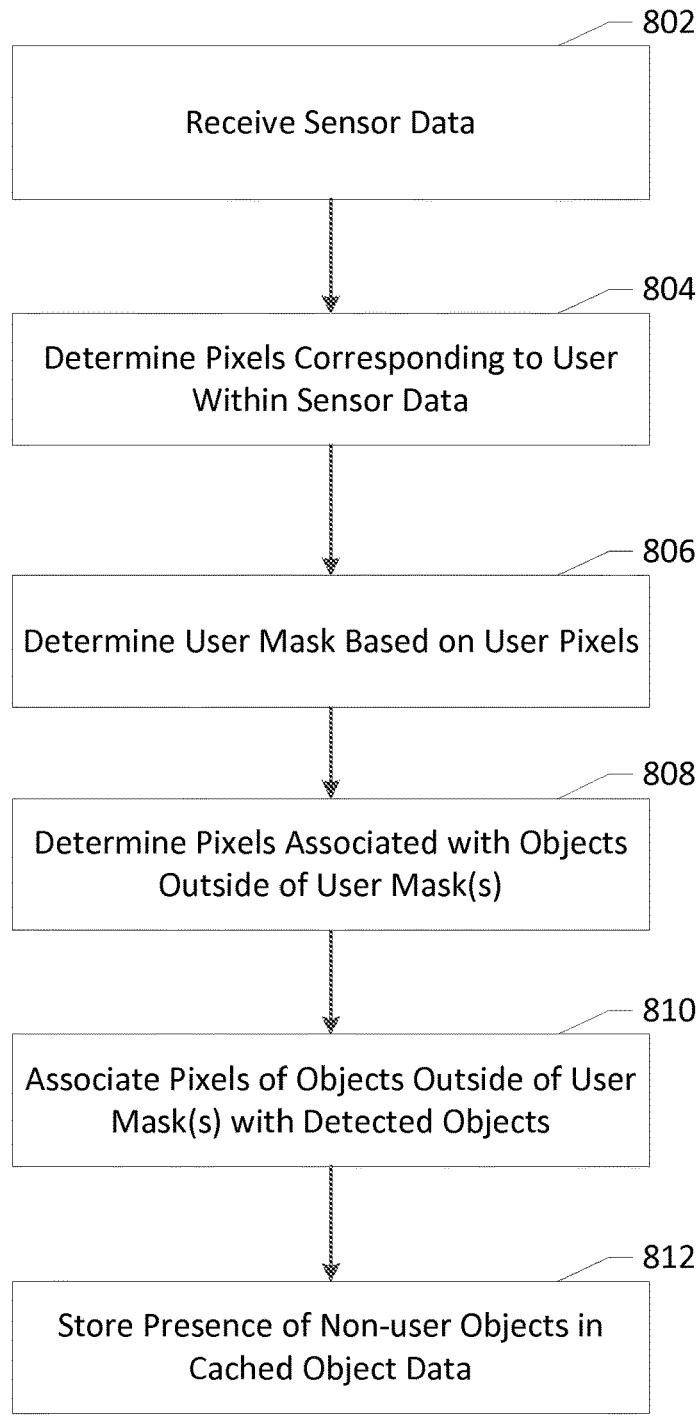
FIG. 8 is a flowchart illustrating an exemplary computer-executable method for separating users from other detected objects in a frame or frames of sensor data in accordance with exemplary embodiments of the present invention.
Figure 9:
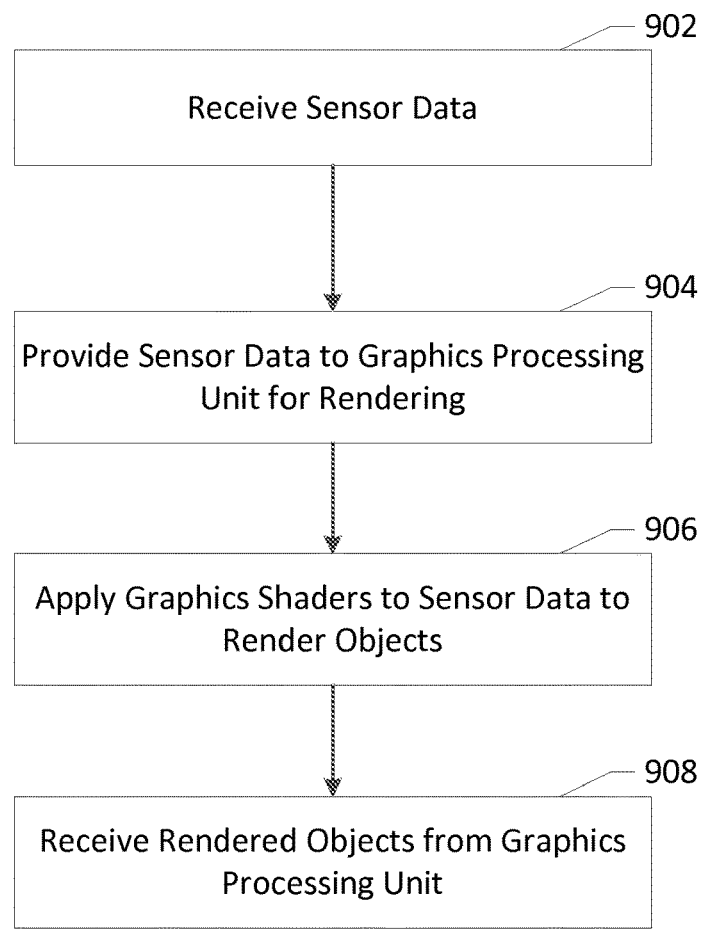
FIG. 9 is a flowchart illustrating an exemplary computer-executable method for using a graphics processing unit to detect objects using sensor data in accordance with exemplary embodiments of the present invention.
Figure 10:
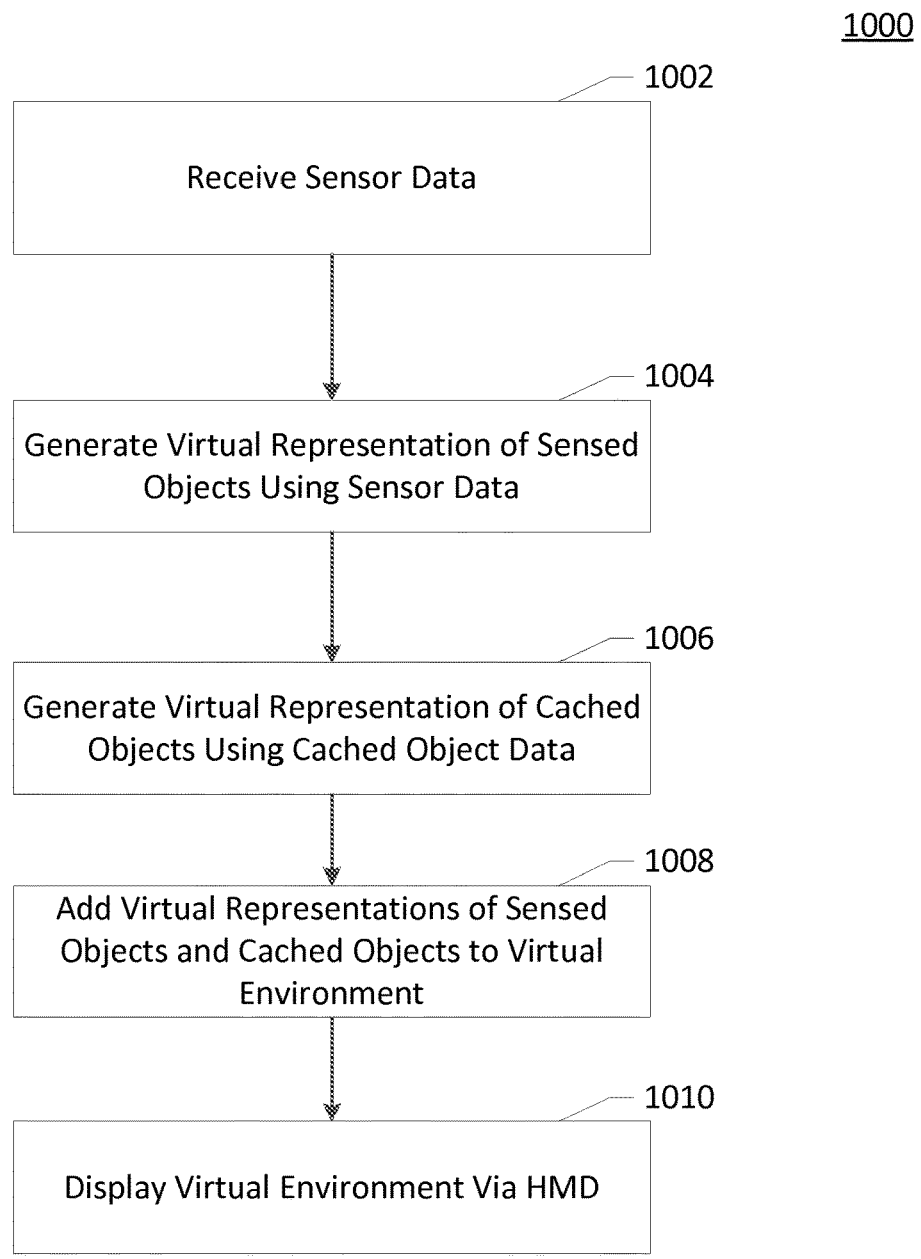
FIG. 10 is a flowchart illustrating an exemplary computer-executable method for displaying a virtual environment including a virtual representation of a local physical environment in accordance with embodiments of the present invention.

Exemplary Computer-Implemented Methods for
Implementing Virtual Representations of a Physical
Environment in Virtual Reality Environment FIGS. 8-10 depict exemplary computer-implemented processes that serve to implement display of virtual representations of a local physical environment in a virtual environment in accordance with exemplary embodiments. These processes may be implemented by computing devices, such as the server 102 depicted with respect to FIG. 1, and the apparatus 200 depicted with respect to FIG. 2.

FIG. 8 is a flowchart depicting an exemplary computer-executable process 800 for separating users from other detected objects in a frame or frames of sensor data in accordance with exemplary embodiments of the present invention. Detected objects other than the user may be cached for later use in reconstructing objects occluded by the user or otherwise not visible to the sensor. The process 800 begins at action 802, where a set of sensor data is received. The set of sensor data may include one or more individual frames of data. In some embodiments, multiple frames of sensor data are processed together to smooth and filter the data and reduce noise and other artifacts. At action 804, pixels of the sensor data corresponding to a user or users are identified. As noted above, pixels associated with users may be determined based on detection of particular user characteristics, gestures, motion patterns, beacons (e.g., infrared beacons on an HMD), or the like.

At action 806, a mask may be applied to a set of pixels or region of the sensor data identified as including a user or users. The mask may be a "halo" extended about the pixels suspected to be a user to exclude a radius of pixels from association with non-user objects. The use of the mask in this manner may ensure that none of the pixels associated with the user are "missed" or erroneously identified as associated with an object other than the user.

At action 808, objects outside of the mask are identified. Objects may be identified by detecting contiguous or closely associated regions within the sensor data with the same or similar values (e.g., similar depth maps indicated by pixel intensities). At action 810, pixels associated with objects are separated into regions suspected of being separate discrete objects. It should be appreciated that although the instant example is described as identifying individual objects, in some embodiments all non-user pixel data may be identified as a single "background" or "non-user" object for the purposes of recreating a virtual representation of the user's physical environment.

At action 812, the detected object or objects other than the user are stored in a set of cached object data. The cached object data may be employed to display virtual representations of the detected objects even in cases where the objects are obscured or occluded from the view of one or more sensors. The cached object data may include one or more models or constructs derived from the pixels of the sensor data identified as associated with objects, or the object data may be stored as raw pixel data.

FIG. 9 is a flowchart illustrating an exemplary computer-executable process 900 for using a graphics processing unit to detect objects using sensor data in accordance with exemplary embodiments of the present invention. As noted above, embodiments may utilize a GPU to process sensor data for rendering in a virtual environment. Since sensor data may be presented as a bitmap including a series of pixels, special-purpose graphics processing hardware such as the GPU may be employed to render objects defined within the sensor data. The process 900 illustrates how a sensor interface may provide sensor data to a GPU for processing and receive a set of rendered objects for display in the virtual environment.

The process 900 begins at action 902 with a set of sensor data being received. As noted above, the sensor data may be received from a variety of sensors, although in the present exemplary context it may be understood that the sensor data is provided in a format suitable for processing by a GPU (e.g., a bitmap). At action 904, the sensor data is provided to the GPU. At action 906, the GPU employs graphics processing techniques, such as the execution of one or more shader programs on the sensor data to render polygons corresponding to objects defined within the sensor data. In particular, the processing performed on the sensor data may identify adjacent, contiguous, and/or proximate pixels with similar intensity/depth/height values and identify regions of such pixels as particular objects and generate appropriate polygons for display.

At action 908, rendered objects is received from and/or displayed by the GPU. The rendered objects may then be employed by a virtual environment engine or other component of a virtual reality system to display the detected objects, cache the detected objects, receive gesture inputs from objects identified as the user, or the like.

FIG. 10 is a flowchart illustrating an exemplary computer-executable process 1000 for displaying a virtual environment including a virtual representation of a local physical environment in accordance with embodiments of the present invention. As noted above, embodiments advantageously provide for display of not just virtual representations of physical objects detected by a sensor, but also display of virtual representations of objects not presently detected by a sensor but previously cached. For example, virtual representations of objects that were previously detected but subsequently occluded by a user or other intervening object may be displayed using cached object data.

At action 1002, sensor data is received. The sensor data may be sensor data as described above with respect to FIGS. 1-9. At action 1004, objects are detected within the sensor data and virtual representations of those detected objects are generated. As noted above, the virtual representations may be generated directly from the sensor data, with the size, shape, and features of the virtual representations corresponding to the sensor data associated with the particular object with which the virtual representation is associated.

At action 1006, virtual representations are created for any objects identified in a set of cached object data. As noted above, the cached object data may include objects that were previously detected but which are not visible within the sensor data. In some embodiments, objects identified in the cached object data are compared against objects identified in the sensor data to determine if each object is actually visible within the sensor data. For example, if a cached object is already visible within the sensor data, then the cached data for that object may be discarded or replaced with new data from the sensor data. In some embodiments, objects may be identified between the sensor data and the cached data by the position of the object, the shape of the object, the size of the object, or the like. Similarly, sensor data may be compared to previously received sensor data to determine if any objects have disappeared or are otherwise no longer visible. Such objects may have corresponding virtual representations retrieved from the cached object data.

At action 1008, both the virtual representations derived from the sensor data and the virtual representations obtained from the cached object data are added to the virtual environment. At action 1010, the virtual environment including the virtual representations is displayed via a HMD.

Figure 11:
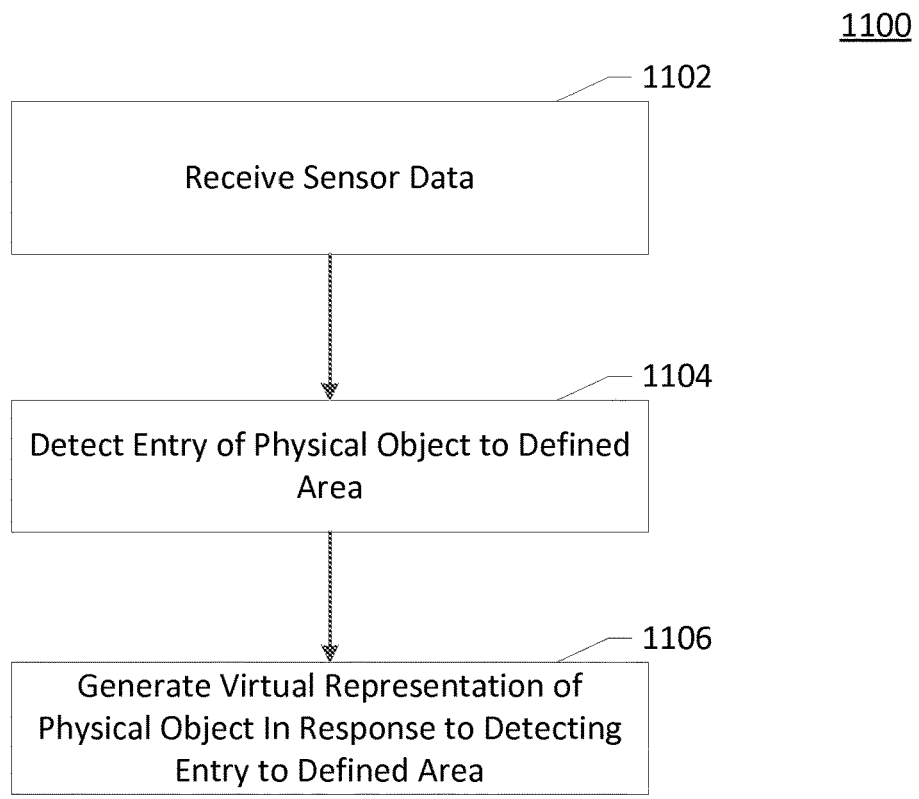
FIG. 11 is a flowchart illustrating an exemplary computer-executable method for displaying a virtual environment including displaying a virtual representation of a physical object based upon entry into a predefined area in accordance with embodiments of the present invention.

FIG. 11 is a flowchart illustrating an exemplary computer-executable process 1100 for displaying a virtual representation of a physical environment in response to detecting the entry of a physical object into a predefined area in accordance with embodiments of the present invention. The process 1100 provides a mechanism for notifying the user when an area of a virtual environment is "off limits" or otherwise warning the user not to enter a particular area of the virtual environment. For example, as the user approaches an edge of a sensor capture range, a boundary marking the edge of the sensor capture environment may be represented as a wall, piece of furniture, or other physical object so that the user is able to perceive the boundary.

At action 1102, the process receives a set of sensor data. The sensor data is used to detect the location at least one physical object. At action 1104, a determination is made as to whether the physical object (e.g., a user) has entered a particular defined area. The defined area may be a boundary of a virtual environment based on available sensor capture frame, a particular area of the sensor environment otherwise indicated as off limits, or the like. At action 1106, a virtual representation of a physical object is generated or displayed in response to the user entering the defined area. In some embodiments, virtual representations of physical objects are only displayed within the virtual environment in response to detection that the user is within a defined area associated with the physical object. For example, as the user approaches a chair, a virtual representation of the chair may be displayed when the user is within a certain distance (e.g., 1 meter, 5 meters, etc.). In this manner, embodiments provide a mechanism for warning users that they are about to leave a designated play area, collide with a physical object, or the like, while retaining the immersive effect of the virtual environment unless such a collision or play area violation is imminent.

In describing exemplary embodiments, specific terminology is used for the sake of clarity. For purposes of description, each specific term is intended to, at least, include all technical and functional equivalents that operate in a similar manner to accomplish a similar purpose. Additionally, in some instances where a particular exemplary embodiment includes a plurality of system elements or method steps, those elements or steps may be replaced with a single element or step. Likewise, a single element or step may be replaced with a plurality of elements or steps that serve the same purpose. Further, where parameters for various properties are specified herein for exemplary embodiments, those parameters may be adjusted up or down by 1/20th, 1/10th, 1/5th, 1/3rd, 1/2nd, and the like, or by rounded-off approximations thereof, unless otherwise specified. Moreover, while exemplary embodiments have been shown and described with references to particular embodiments thereof, those of ordinary skill in the art will understand that various substitutions and alterations in form and details may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than shown.

Blocks of the block diagram and the flow chart illustrations support combinations of means for performing the specified functions, combinations of steps for performing the specified functions and program instruction means for performing the specified functions. It will also be understood that some or all of the blocks/steps of the circuit diagram and process flowchart, and combinations of the blocks/steps in the circuit diagram and process flowcharts, can be implemented by special purpose hardware-based computer systems that perform the specified functions or steps, or combinations of special purpose hardware and computer instructions. Exemplary systems may include more or fewer modules than those illustrated in the exemplary block diagrams.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method for implementing a virtual representation of a physical environment using a virtual reality environment, the method comprising:
   receiving a first set of sensor data from a sensor capable of detecting objects by generation of a depth map;
   identifying at least one physical object within a real-world field of view of the sensor from the first set of sensor data, wherein identifying the at least one physical object within the real-world field of view includes generating a depth map including a frame of pixels associated with particular physical locations in the real-world field of view;
   determining a physical position of the at least one physical object using at least the first set of sensor data, the physical position of the at least one physical object being a location other than a location of the user;
   detecting whether a user is physically located within a pre-defined distance from the physical location of the at least one physical object;
   only in response to detecting that the user is physically located within the pre-defined distance, generating a virtual representation of the at least one physical object based at least in part on the first set of sensor data, the virtual representation being configured to warn the user of proximity with the at least one physical object;
   generating a virtual environment comprising the virtual representation of the at least one physical object and a virtual representation of at least one virtual object, wherein the virtual environment comprises a set of coordinates which correspond to a physical area in which the at least one physical object is present, and wherein the virtual representation of the at least one physical object is positioned in the virtual environment at a coordinate location that maps to the physical position of the at least one physical object;
   determining whether a viewing angle of the user comprises the coordinate location that maps to the physical position of the at least one physical object; and
   in response to determining that the viewing angle of the user comprises the coordinate location that maps to the physical position of the at least one physical object, sending instructions to a head-mounted display, the instructions being configured to display tothe user at least a portion of the virtual environment comprising the virtual representation of the at least one physical object at a virtual location corresponding to the physical position of the at least one physical object relative to the user.

2. The method of claim 1, further comprising:
   storing the virtual representation of the at least one physical object in a set of cached object data;

receiving a second set of sensor data;
determining that the at least one physical object is not present in the second set of sensor data;
retrieving the virtual representation of the at least one physical object from the set of cached object data; and
sending instructions to the head-mounted display to display the retrieved virtual representation of the at least one physical object at a last known position of the at least one physical object.

3. The method of claim 2, further comprising determining that the at least one physical object is at least partially occluded prior to retrieving the virtual representation of the physical object form the set of cached object data.

4. The method of claim 1, wherein the at least one physical object is a user.

5. The method of claim 1, wherein identifying the at least one physical object further comprises:
providing the first set of sensor data to a graphics processing unit; and
using at least one shader executing on the graphics processing unit to generate at least one polygon corresponding to he at least one physical object from the first set of sensor data.

6. The method of claim 5, further comprising instructing the head-mounted display to display the at least one polygon within the virtual environment.

7. The method of claim 1, further comprising identifying the physical object within the first set of sensor data by defining a mask about a plurality of pixels defining the physical object, wherein the mask extends the plurality of pixels defining the physical object by a predetermined number of pixels.

8. The method of claim 1, wherein identifying the at least one physical object from the first set of sensor data further comprises identifying a first plurality of pixels of the first set of sensor data as a user and a second plurality of pixels of the first set of sensor data as background data.

9. The method of claim 8, wherein the at least one physical object is defined within the first set of sensor data by the background data.

10. A non-transitory computer-readable storage medium comprising instructions for implementing a virtual representation of a physical environment using a virtual reality environment, that, when executed by a processor, configure the processor for:
receiving a first set of sensor data from a sensor capable of detecting objects by generation of a depth map;
identifying at least one physical object within a real-world field of view of the sensor from the first set of sensor data, wherein identifying the at least one physical object within the real-world field of view includes generating a depth map including a frame of pixels associated with particular physical locations in the real-world field of view;
determining a physical position of the at least one physical object using at least the first set of sensor data, the physical position of the at least one physical object being a location other than a location of the user;
detecting whether a user h-as is physically located within cntcrcd a pre-defined distance from the physical location of the at least one physical object;
only in response to detecting that the user is physically located within the pre-defined distance, generating a virtual representation of the at least one physical object based at least in part on the first set of sensor data, the virtual representation being configured to warn the user of proximity with the at least one physical object;
generating a virtual environment comprising the virtual representation of the at least one physical object and a virtual representation of at least one virtual object, wherein the virtual environment comprises a set of coordinates which correspond to a physical area in which the at least one physical object is present, and wherein the virtual representation of the at least one physical object is positioned in the virtual environment at a coordinate location that maps to the physical position of the at least one physical object;
determining whether a viewing angle of the user comprises the coordinate location that maps to the physical position of the at least one physical object; and
in response to determining that the viewing angle of the user comprises the coordinate location that maps to the physical position of the at least one physical object, sending instructions to a head- mounted display, the instructions being configured to display to the user at least a portion of the virtual environment comprising the virtual representation of the at least one physical object at a virtual location corresponding to the physical position of the at least one physical object relative to the user.

11. The non-transitory computer-readable storage medium of claim 10, wherein the instructions further comprise further comprise:
storing the virtual representation of the at least one physical object in a set of cached object data;
receiving a second set of sensor data;
determining that the at least one physical object is not present in the second set of sensor data;
retrieving the virtual representation of the at least one physical object from the set of cached object data; and
sending instructions to the head-mounted display to display the retrieved virtual representation of the at least one physical object at a last known position of the at least one physical object.

12. A system for implementing a virtual representation of a physical environment using a virtual reality environment, the system comprising:
sensor interface circuitry configured to: receive a first set of sensor data from a sensor capable of detecting objects by generation of a depth map;
identify at least one physical object within a real-world field of view of the sensor from the first set of sensor data, wherein identifying the at least one physical object within the real-world field of view includes generating a depth map including a frame of pixels associated with particular physical locations in the real-world field of view; and
determine a physical position of the at least one physical object using at least the first set of sensor data, the physical position of the at least one physical object being a location other than a location of the user; and
virtual environment state management circuitry configured to:
detect whether a user is physically located within a pre-defined distance from the physical location of the at least one physical object;
only in response to detecting that the user is physically located within the pre-defined distance, generate a virtual representation of the at least one physical object based at least in part on the first set of sensor data, the virtual representation being configured to warn the user of proximity with the at least one physical object;
generate a virtual environment comprising the virtual representation of the at least one physical object and a virtual representation of at least one virtual object, wherein the virtual environment comprises a set of coordinates which correspond to a physical area in which the at least one physical object is present, and wherein the virtual representation of the at least one physical object is positioned in the virtual environment at a coordinate location that maps to the physical position of the at least one physical object;

determine whether a viewing angle of the user comprises the coordinate location that maps to the physical position of the at least one physical object; and in response to a determination that the viewing angle of the user comprises the coordinate location that maps to the physical position of the at least one physical object, send instructions to a head-mounted display, the instructions being configured to display to the user at least a portion of the virtual environment comprising the virtual representation of the at least one physical object at a virtual location corresponding to the physical position of the at least one physical object relative to the user.

13. The system of claim 12, wherein:

the sensor interface circuitry is further configured to:
  receive a second set of sensor data; and
  determine that the at least one physical object is not present in the second set of sensor data; and
the virtual environment state management circuitry is further configured to:
  store the virtual representation of the at least one physical object in a set of cached object data;
  retrieve the virtual representation of the at least one physical object from the set of cached object data; and
  send instructions to the head-mounted display to display the retrieved virtual representation of the at least one physical object at a last known position of the at least one physical object.

14. The system of claim 13, wherein the sensor interface circuitry is further configured to determine that the at least one physical object is at least partially occluded prior to retrieving the virtual representation of the physical object form the set of cached object data.

15. The system of claim 12, wherein the at least one physical object is a user.

16. The system of claim 12, wherein identifying the at least one physical object further comprises:
  providing the first set of sensor data to a graphics processing unit; and
  using at least one shader executing on the graphics processing unit to generate at least one polygon corresponding to he at least one physical object from the first set of sensor data.

17. The system of claim 16, wherein the virtual environment state management circuitry is further configured to instruct the head-mounted display to display the at least one polygon within the virtual environment.

18. The system of claim 12, wherein the sensor interface circuitry is further configured to identify the physical object within the first set of sensor data by defining a mask about a plurality of pixels defining the physical object, wherein the mask extends the plurality of pixels defining the physical object by a predetermined number of pixels.

19. The system of claim 12, wherein identifying the at least one physical object from the first set of sensor data further comprises identifying a first plurality of pixels of the first set of sensor data as a user and a second plurality of pixels of the first set of sensor data as background data.

* * * * *

UNITED STATES PATENT AND TRADEMARK OFFICE
CERTIFICATE OF CORRECTION

PATENT NO. : 10,725,297 B2  
APPLICATION NO. : 14/608067  
DATED : July 28, 2020  
INVENTOR(S) : Kraver Page 1 of 1

It is certified that error appears in the above-identified patent and that said Letters Patent is hereby corrected as shown below:

In the Claims

Column 24
Line 59, "tothe" should read --to the--

Column 25
Lines 59-61, "detecting whether a user h-as is physically located within entered a
pre-defined distance from the physical location of the at least one physical object;"
should read --detecting whether a user is physically located within a pre-defined distance from
the physical location of the at least one physical object--

Column 26
Line 17, "head- mounted" should read --head-mounted--

Signed and Sealed this
Tenth Day of November, 2020

Andrei Iancu
*Director of the United States Patent and Trademark Office*